United States Patent
Mehra et al.

(10) Patent No.: US 7,509,657 B2
(45) Date of Patent: Mar. 24, 2009

(54) APPLICATION PROGRAMMING INTERFACE FOR A VIRTUAL SWITCH

(75) Inventors: Pankaj Mehra, San Jose, CA (US); Rahul Nim, Fremont, CA (US); James R. Hamrick, Murrieta, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 10/695,210

(22) Filed: Oct. 28, 2003

(65) Prior Publication Data
US 2005/0091358 A1    Apr. 28, 2005

(51) Int. Cl.
*G06F 9/54* (2006.01)
*G06F 13/14* (2006.01)
(52) U.S. Cl. .................... 719/328; 709/228
(58) Field of Classification Search ........... 719/328; 709/228, 223
See application file for complete search history.

(56) References Cited

U.S. PATENT DOCUMENTS

| | | | |
|---|---|---|---|
| 5,550,816 A * | 8/1996 | Hardwick et al. | 370/397 |
| 2003/0046657 A1* | 3/2003 | White | 717/105 |
| 2003/0051048 A1* | 3/2003 | Watson et al. | 709/238 |
| 2003/0061379 A1* | 3/2003 | Craddock et al. | 709/238 |
| 2004/0267866 A1* | 12/2004 | Carollo et al. | 709/200 |

\* cited by examiner

*Primary Examiner*—Meng-Ai An
*Assistant Examiner*—Abdou K Seye (57) ABSTRACT

An electronic system may include an application programming interface for use in conjunction with a virtual switch. In some embodiments, the electronic system may comprise a processor; a network interface controller including a hardware port, a virtual switch comprising software executed by the processor, and an application programming interface ("API") running on the processor and usable by a application to interface with the virtual switch.

22 Claims, 3 Drawing Sheets

APPLICATION PROGRAMMING INTERFACE FOR A VIRTUAL SWITCH

CROSS-REFERENCE TO RELATED APPLICATIONS

This application contains subject matter that may be related to application Ser. No. 10/339,146, filed Jan. 9, 2003, incorporated herein by reference.

BACKGROUND

Computer networks may comprise various end nodes coupled via one or more switches. A switch generally comprises multiple ports and circuitry that receives messages over an input port and forwards such messages out through an output port. As networks grow in complexity and size, switch circuitry also grows in complexity.

A node may comprise a computer having one or more processors that execute one or more applications that perform a variety of functions (e.g., data processing and network management). A node also may have one or more network interface controllers ("NICs") that provide the node access to the network. Via a NIC, a node can send or receive packets to or from other nodes in the network. In some implementations, a packet may contain "source route" information which generally specifies the output port of source node and various intervening switches that the packet is to follow in order to traverse the network. As such, the source route information provides directions to the network that permit it to deliver the packet from source node to destination node.

Generally, The source route information is sufficient to permit the network to route the packet to the NIC of the destination node. The source route information is however insufficient for choosing a specific target application on the destination node. The logic for generating and consuming source-routed packets at end nodes must therefore reside inside operating system's NIC device driver, rather than inside application code. As such, the management applications are not part of the source routing paradigm which creates inefficiencies in how packets are transferred between management application processes and NIC drivers. Moreover, allowing multiple management applications to share a source routed interconnection network requires additional device driver functionality, which in turn either limits functionality or further increases driver complexity. Any improvements in this area that can make for a more efficiently operated network and/or provide more functionality are desirable.

BRIEF SUMMARY

One or more of the problems noted above may be solved by an electronic system that includes an application programming interface for use in conjunction with a virtual switch. In at least some embodiments, the electronic system may comprise a processor, a network interface controller including a hardware port, a virtual switch comprising software executed by the processor, and an application programming interface ("API") running on the processor and usable by applications to interface with the virtual switch.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct connection, or through an indirect electrical connection via other devices and connections.

DETAILED DESCRIPTION

The following discussion is directed to various embodiments of the invention. Although one or more of these embodiments may be preferred, the embodiments disclosed should not be interpreted or otherwise used as limiting the scope of the disclosure, including the claims, unless otherwise specified. In addition, one skilled in the art will understand that the following description has broad application, and the discussion of any embodiment is meant only to be exemplary, and not intended to intimate that the scope of the disclosure, including the claims, is limited to these embodiments.

Figure 1:
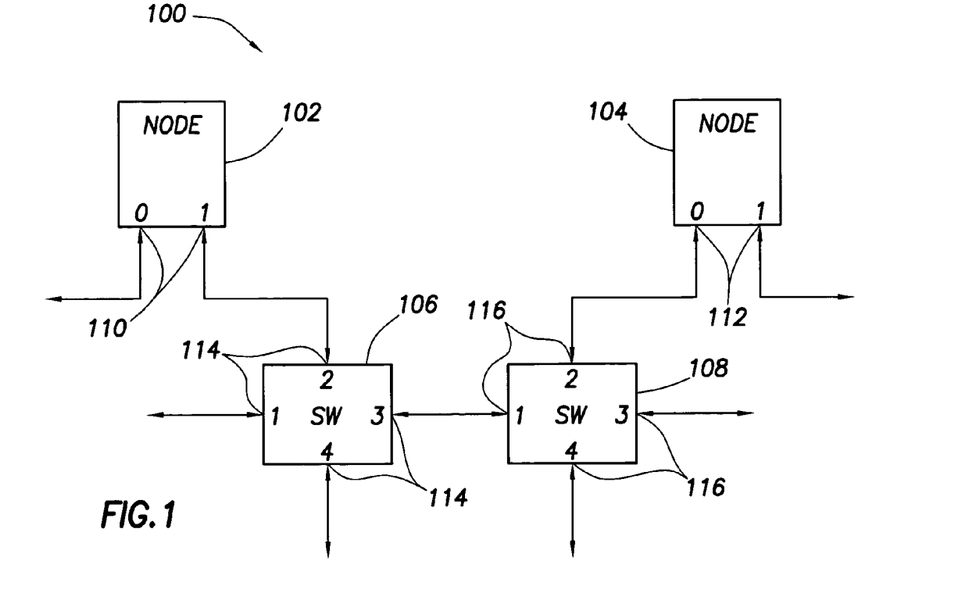
FIG. 1 shows a system including end nodes and switches in accordance with embodiments of the invention.

Referring now to FIG. 1, an exemplary network 100 may comprise end nodes 102 and 104 and switches 106 and 108. As shown, node 102 couples to switch 106 which, in turn, couples to switch 108. Switch 108 also couples to node 104. Packets (e.g., data packets, management packets, etc.) may be transmitted back and forth between nodes 102 and 104 via switches 106 and 108. It should be understood that the topology depicted in FIG. 1 is exemplary of numerous possible topologies. More than two nodes may be included in the system and any number of switches (i.e., one or more) may be used to create the network infrastructure.

Each end node 102, 104 may comprise a computer system having one or more processors, volatile memory, non-volatile memory (e.g., hard drive, CD ROM, etc.), an input device (e.g., keyboard, mouse, etc.) and an output device (e.g., a display). An end node may also comprise devices other than computers. For example, an end node may comprise a network storage device.

The switches 106, 108 may comprise logic that receives packets and forwards such packets on to other switches or nodes. For example, switch 106 may receive packets from node 102 and forward such packets to switch 108. Switch 106 may also receive packets from switch 108 and forward such packets to node 102. Switch 108 functions similarly by forwarding packets received from switch 106 to node 104 and from node 104 to switch 106.

Each node 102, 104 and switch 106, 108 may include one or more hardware ports 110, 112, 114 and 116 which permit connection to other nodes/switches. As shown, each end node 102 includes hardware ports 110, while end node 104 includes hardware ports 112. Switch 106 may include hardware ports 114, while switch 108 may include hardware ports 116. Each port is assigned a port identifier (also called a "port number") which is used to construct the source route information described below. For example, the hardware ports 110, 112 associated with nodes 102 and 104 may have port identifiers "0" and "1" as shown. Switches 106 and 108 each may have four ports having the port identifiers "1," "2," "3," and "4" as shown. Ports 1 and 4 on switch 106 and ports 3 and 4 on switch 108 may be used to connect to other switches or nodes (not shown). Although end nodes 102 and 104 are shown in FIG. 1 as only including two hardware ports 110, 112, the nodes may include any number of hardware ports desired. Similarly, switches 106, 108 are shown with four hardware ports each, but the switches may contain any number of ports. In some embodiments, each switch includes 16 hardware ports.

Referring briefly to FIG. 1, a request packet may be transferred from node 102 through switches 106 and 108 to node 104, and an associated response packet may be transferred in the opposite direction. The packet may contain source route information which may include a list of the output ports along the path to be traversed by the packet. For example, the request packet being transmitted from node 102 to node 104 may contain the list "3-2" within its source route string representing output port 3 on switch 106 and output port 2 on switch 108. The source route string additionally may include a direction bit and a pointer field, and may be terminated by an "end of route" marker which may be a predetermined value. The Direction Bit indicates whether the list is being used in the forward direction or the reverse direction. The pointer field identifies the next field to use within the output port list. A pointer field value of 1 refers to the first value in the output port list; the value 2, the second value; and so on. In the following example the construct[Fwd; 1] indicates the direction bit being set to indicate the forward direction and the value "1" represents the pointer field, which in this example identifies the port number in the source route string that should be used to forward the packet. For example, node 102 may receive a request to transmit to node 104 via port 1 the packet containing the source route string "3-2-63 [Fwd; 1] 11 where "Fwd" indicates whether the pointer should be incremented or decremented in order to point to the next port in the source-route, and "1" is the pointer value. Node 102 may send that packet to switch 106 via a specified output port (port 1) so that the packet will arrive at switch 106 at its port 2. That packet's pointer will now specify port identifier 3 which informs switch 106 that the packet should be forwarded out through port 3 to switch 108. Prior to transmitting, the switch 106 may store the port of arrival, in this case port 2, at the current pointer location and then advance (i.e., increment) the pointer. The switch 108, therefore, will receive the packet containing "2-2-63 [Fwd; 2]" at its port 1. The switch 108 will forward the packet out of its port 2 after setting the source route string to "2-1-63 [Fwd; 3]" so that the packet will be delivered to node 104. The node 104 may create a response packet by turning the packet around using the incoming source route in the reverse direction as follows. Node 104 may send a packet containing the source-route string "2-1-63 [Rev; 2] to switch 108. In turn, the switch 108 will forward the packet containing the source-route string "2-2-63 [Rev; 1] to switch 106. Ultimately, the packet will reach its destination node 102 containing the source-route string "3-2-63 [Rev; 0]. On packets with the source route string specifying the reverse direction, a pointer field value of 0 may signify the end of the route.

Figure 2:
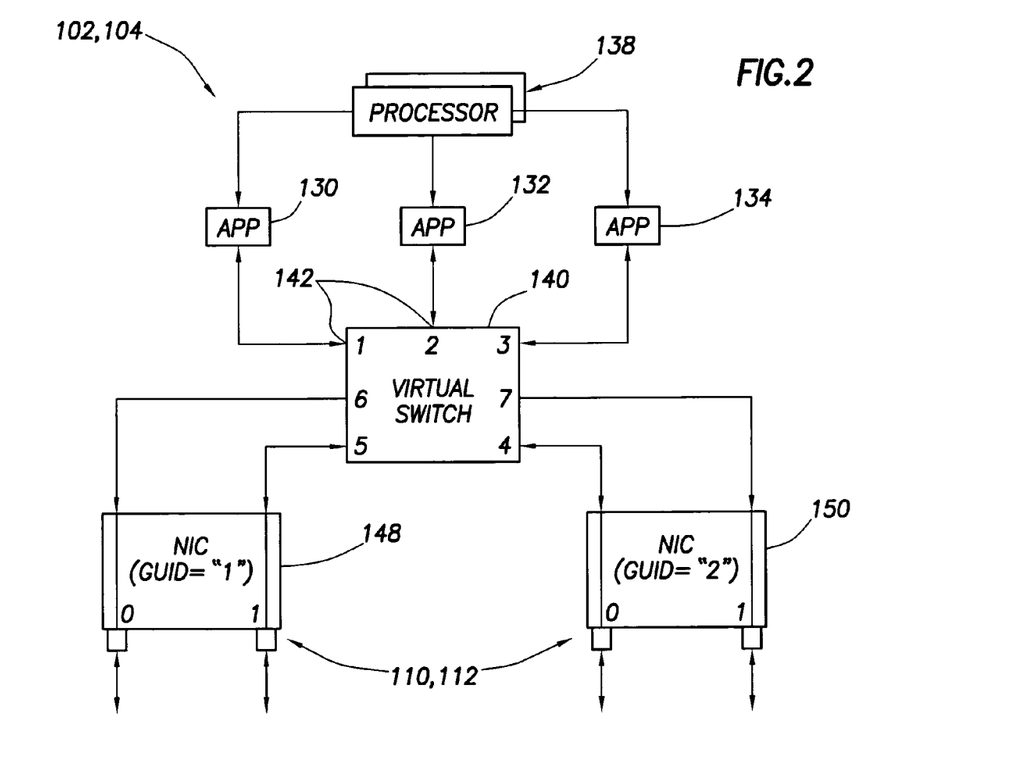
FIG. 2 shows a more detailed block diagram of an end node and includes a virtual switch in accordance with embodiments of the invention.

Referring now to FIG. 2, each node 102, 104 may comprise one or more applications 130, 132, and 134 running on one or more processors 138, a virtual switch 140 and one or more NICs 148, 150. Other devices (e.g., memory, input device such as keyboards, and output devices such as displays) may be included as well. The applications 130-134 may perform a variety of functions such as data processing and network management. The NICs 148, 150 provide the node access to the network. A NIC may have one or more hardware ports. In the embodiment illustrated in FIG. 2, the NICs have two hardware ports with corresponding port identifiers "0" and "1". The example of FIG. 2 includes two NICs 148, 150 which provide four hardware ports. However, any number (i.e., one or more) of NICs may be included in a node as desired. Each NIC also may be assigned a global unique identifier ("GUID"). For example, as shown in FIG. 2, NIC 148 may be assigned a GUID of "1" and NIC 150 may be assigned a GUID of "2." Consequently, each of the hardware ports on a NIC may be identified by the GUID corresponding to that NIC and the particular port number.

As introduced above and in accordance with various embodiments of the invention, a node 102, 104 includes a virtual switch 140. The virtual switch 140 may be implemented in software (e.g., kernel component drivers) stored on a computer readable storage medium and may be executed by processor(s) 138. As will be explained in more detail below, the virtual switch 140 permits the source routing paradigm to be extended to the user applications space in order to allow source-routed packets to target one or more applications on a node (e.g., applications 130-134). Further, the virtual switch 140 may permit packet-forwarding logic for source routed networks, as well as multiple management functions, to be implemented as user-mode applications, rather than as device drivers. As a result, management functions may be moved out of the operating system kernel and implemented more flexibly as ordinary applications or services. It may also enable modular and distributed management applications by allowing multiple entities to share a network interface at an end node in a source-routed, packet-switched network. Application-to-application (within the same node), application-to-hardware port, and hardware port-to-hardware port communications may also be enabled with the virtual switch 140.

Referring still to FIG. 2, the virtual switch 140 may contain a plurality of virtual ports 142. In the example of FIG. 2, virtual switch 140 includes seven virtual ports 142, designated for purposes of illustration by virtual port numbers 1-7. Any number of virtual ports 142 may be included. Each application 130-134 desiring access through the virtual switch 140 to the network also may be assigned one or more virtual ports 142 (referred to as application port identifiers or "APIDs"). As such, a packet originating from an application 130-134 may include source routing information that comprises virtual port identifiers 142, as well as hardware port identifiers 110, 112, 114, and/or 116 (see also FIG. 1). The applications 130-134 may assemble the source route strings without any particular awareness that some of the port identifiers may be associated with a virtual switch while other ports may be associated with hardware devices (e.g., switches). In short, the inclusion of virtual switches 140 is generally transparent to the user application space.

The virtual ports associated with the virtual switch 140 may contain any desired number of ports. In accordance with various embodiments of the invention, the virtual switch 140 may include 64 virtual port numbers. The 64 virtual port numbers (0-63) may be divided into three groups. One group includes port numbers 0 through 15 and represent hardware ports. Another group includes port numbers 32 through 62 and represents general use APIDs. The remaining port numbers 16-31 and 63 correspond to APIDs for special applications. These special purpose APIDs may be used to implement services whose clients assume a simplified discovery model by always using a well-known dedicated APID.

In accordance with representative embodiments, an application 130-134 may be registered with the virtual switch 140 to assign the application an APID. Accordingly, the application may call an initialization function to cause an APID to be assigned for that application. If desired, the initialization function call may contain an APID value that the application wishes to use. The initialization function may return an APID value that represents the APID that was granted to the application. The APID granted to the application may or may not be the same as the requested APID.

As discussed above, the virtual switch 140 may receive a packet on one of its virtual ports 142 and forwards that packet out through one of its other virtual ports. In accordance with various embodiments of the invention, the virtual switch 140 receives an incoming packet and determines the type of responsive action to take. The responsive action may be any one or more of the following: (1) to forward the packet out through a NIC hardware port 110, 112; (2) to forward the packet to one or more applications (e.g., applications 130, 132, 134); (3) to consume the packet inside the virtual switch 140 for virtual-switch configuration by a remote management entity (not shown); or (4) to reject the incoming packet, optionally generating a Negative Acknowledgement ("NACK") response indicating invalid source route information. Thus, the virtual switch 140 generally includes forwarding logic (preferably implemented in software) that forwards incoming packets to appropriate destinations.

Figure 3:
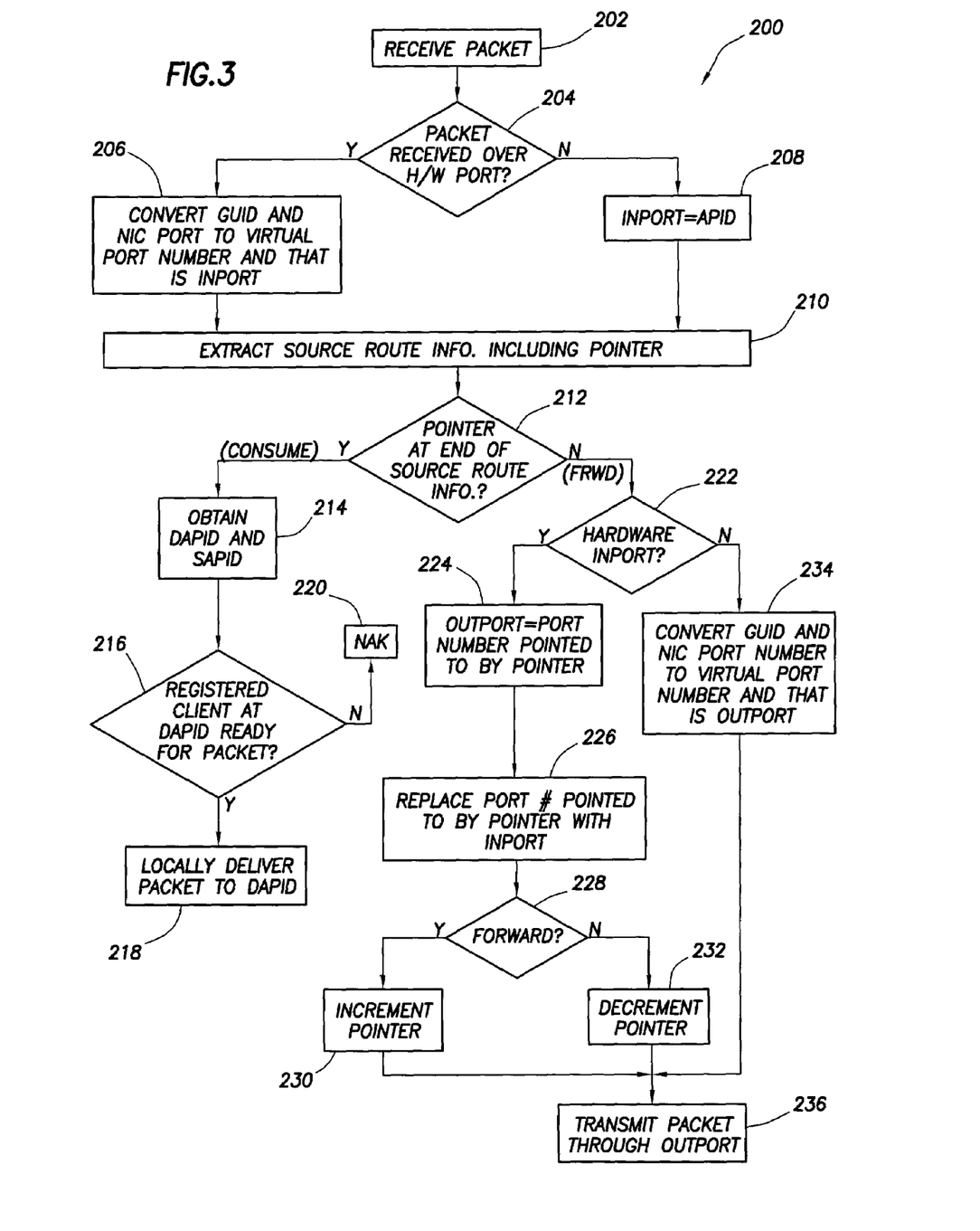
FIG. 3 shows a flow chart exemplifying the forwarding logic implemented in the virtual node of FIG. 2 in accordance with embodiments of the invention.

Referring now to FIG. 3, an exemplary packet forwarding process 200 is shown that the virtual switch 140 may implement. The virtual switch 140 may implement an algorithm that performs the functionality depicted in the example of FIG. 3. Process 200 begins upon the receipt of a packet (block 202) into one of the virtual ports 142 of the virtual switch 140. Blocks 204-208 generally determine the virtual port 142 over which the packet was received by the virtual switch 140. In decision block 204, the virtual switch 140 determines whether the packet was received into the node 102, 104 via a hardware port (e.g., 110, 112). The decision may be made by determining if the input port identifiers are within the range of port values associated with hardware ports as noted above. If the packet, in fact, was received via a hardware port 110, 112, then in block 206, the GUID and port number associated with the NIC and hardware port over which the packet was received are converted to the virtual switch port identifier 142 that is associated with that particular NIC and hardware port. In the example of FIG. 2, the virtual port identifiers associated with the hardware ports 110, 112 are "4" through "7." The virtual switch port 142 resulting from the conversion represents the "inport" for purposes of FIG. 3 and may be used to modify the source route information as described below so as to create a source route string defining a return path for the packet if needed. For example, if a packet is received via port 1 of NIC 148 (GUID 1), that packet is provided to port 5 of virtual switch 140. Thus, the conversion process of block 206 would result in GUID 1, port 1 being converted to a value of "5" which represents the inport value.

If, per decision block 204, the packet is not received via a hardware port, control passes to block 208. In this situation, the packet was received via a virtual port 142 ("APID"). In block 208, the APID 142 is used to represent the inport value. Following completion of blocks 206 or 208, control passes to block 210 in which the packet's source route information, including the pointer, is extracted. The source route information may comprise a string of one or more port numbers (virtual and/or hardware) that identify the path that the packet has taken or will take on its journey from source to destination. The pointer identifies (i.e., "points to") the particular port identifier in the source route information to which the packet should be forwarded. If the pointer is pointing to the end of the source route string, then the packet is considered to be at the end of its journey and the virtual switch 140 determines that the packet should be "consumed" by the end node (i.e., processed in a suitable manner). In block 212, the virtual switch 140 determines from the source route information whether the pointer is pointing to the end of the source route string. If the answer is "yes" (indicating that the packet is at the end of the path), control passes to block 214 in which the source APID ("SAPID") and destination APID ("DAPID") are obtained from the packet's source route information. If a client application exists on the node that is registered having the APID specified by the DAPID (decision 216), then the packet is delivered in block 218 to the destination application associated with specified DAPID. Otherwise, if no client exists that is registered with the specified DAPID, then in block 220 a response packet may be generated containing a negative acknowledgment indicating this condition.

Returning to decision block 212, if the pointer is not pointing to the end of the source routing string, the packet is forwarded on to the port to which the pointer is currently pointing. The inport, assigned as described above, may be pointing to either a hardware port or a virtual port as determined by decision block 222. In the former case (inport pointing to a hardware port), an "outport" value is computed as, or otherwise determined to be, the port number pointed to by the pointer (block 224). The outport number is the port through which the packet is to be transmitted from the virtual switch 140. In block 226, the port identifier in the source routing string currently identified by the pointer may be replaced with the inport number determined in blocks 206 or 208. This action of replacing the port identifier permits the source route information to be modified as the packet passes through the virtual switch in one direction so that if a responsive packet is sent back, the source route information for that return packet will be computed automatically. In this way, only the source node of a packet needs to know the source route information—by the time the packet reaches the destination node, the return source route path has already been computed for the destination node. If desired, the hardware switches 106, 108 may also implement the port identifier replacement process described above.

In addition to replacing the port identifier in the source route information with the inport value, the pointer may be adjusted so as to point to the port in the source route information corresponding to the next entity (switch, node, etc.) on the packet's journey through the network from source to destination. To that end, the pointer may either be incremented or decremented depending on which direction the packet is moving through the network. The packet may contain a direction bit to indicate either forward or reverse direction. The "forward" direction denotes the direction of the path from source to destination. The "reverse" direction denotes the direction of the path from destination back to source, such as for a response packet. This logic is depicted by decision block 228, which determines if the packet is moving in the forward direction, and block 230 in which the pointer is incremented if the packet is moving in the forward direction and block 232 in which the pointer is decremented for the reverse direction. By way of example, when the source route string comprises "0-4-5" and the pointer field points to the value "4," the above logic will adjust the pointer field to point to 0 or 5, respectively, when the direction bit indicates forward or reverse. Thus, decision block 228 may be performed by checking the direction bit.

If decision block 222 reveals that the pointer is not pointing to a hardware port, then it may be determined that the packet is to be sent out of the virtual switch 140 through a virtual port 142. In this case, control passes to block 234 in which the NIC GUID and port number are converted to a virtual switch port number 142. The resulting virtual port number represents the outport number.

Once the outport number is determined for the packet, the packet is transmitted out through the specified outport number (block 236).

Figure 4:
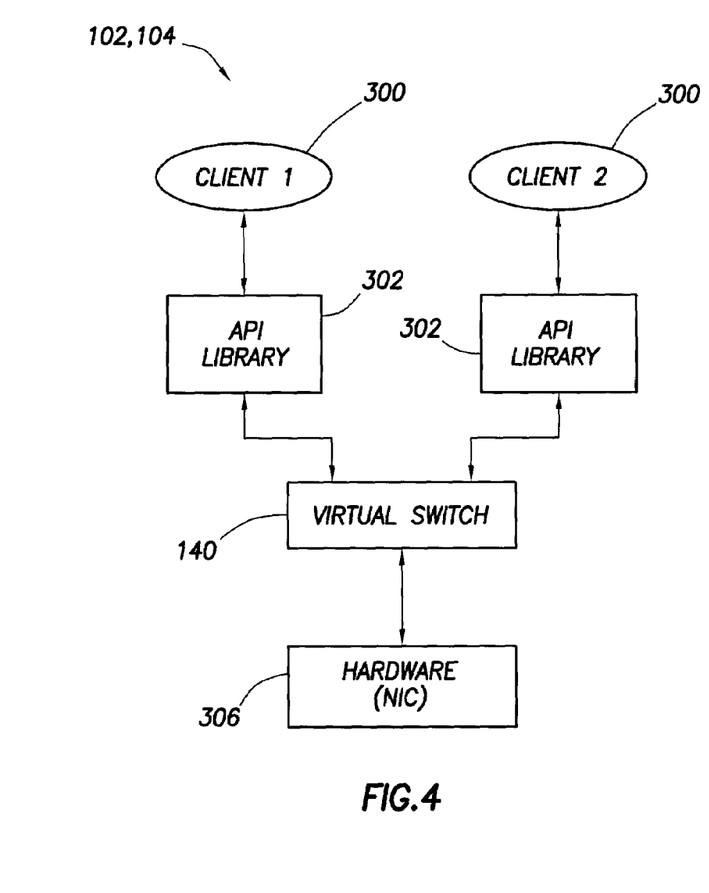
FIG. 4 shows a system including an application programming interface ("API") library implementing an API for the virtual switch.

FIG. 4 shows an embodiment of an end node (e.g., nodes 102 or 104). As shown, one or more clients 300 (e.g., applications), one or more application programming interface ("API") libraries 302, virtual switch 140 and hardware 306. The exemplary embodiment shown in FIG. 4 includes two clients 300 and an API library 302 associated with each client. The hardware 306 may refer to a variety of hardware components including NICs 148, 150 and other hardware components.

The API library 302 includes one or more API calls that permit the associated client to perform a variety of actions such as communicating with other clients using the virtual switch described above. In general, the API library 302 includes calls that permit a client 300 to register and deregister itself with the virtual switch. The API library also includes calls that permit data to be transferred to and from the client. The following describes at least some of the API calls that may be included in the API library 302. Table 1 below provides a list of the calls along with a brief description of the calls. Additional detail for each call is provided following the table.

TABLE 1

| Call | Brief Description |
|---|---|
| IBC_Init ( ) | Registers the client with the virtual switch |
| IBC_Finish ( ) | Deregister the client from the virtual switch |
| IBC_Send ( ) | Sends a packet |
| IBC_CloseHandle ( ) | Closes a handle |
| IBC_RecvPost ( ) | Opens a handle and posts a receive on the handle |
| IBC_RecvWait ( ) | Waits for previously posted receives |
| IBC_RecvWaitAny ( ) | Waits for any of previously posted receives indicated by a list of passed handles to complete |
| IBC_RecvPoll ( ) | Polls for arrival of a packet for a previously posted receive |

The API described below may be based on the In-Band Control ("IBC") which generally specifies a protocol for messaging in a network. An example of the IBC protocol may be described in "ServerNet® In-Band Control (IBC) Programming Specification Switch 2 Release 3, Part Number: 427638-001, Compaq Computer Corporation, May 17, 2001," incorporated herein by reference.

The IBC_Init ( ) call permits a client 300 to register itself with the virtual switch. Via the IBC_Init ( ) call, each client registered with the virtual switch may be assigned an application identifier ("APID") that uniquely distinguishes that client from other registered clients, if any. The input parameter to the IBC_Init( ) call may include a requested identifier ("RequestedID") value which permits the client to request a specific APID. The client 300 may request a specific APID for any of variety of purposes including, without limitation, performing diagnostic applications that may be permitted to operate only in an administrator mode. The requested identifier may be passed to the virtual switch as a parameter in the IBC_Init( ) call itself. The virtual switch determines whether to grant the requested identifier. This determination may be based, at least in part, on whether the requested identifier has already been assigned to another client. If the client 300 does not need a specific identifier, the client may pass a predetermined value, such as IBC_CLIENTANY, in the RequestedID field in the call to indicate that the virtual switch may choose or determine any APID for the client.

If the requested identifier is granted by the virtual switch, the call may return with a success indicator. In at least some embodiments, a success may be indicated by a value of 0 returned from the call. Otherwise, the call may return one or more error flags. Such errors may include any one or more of the following: IBC_BADPARAM, IBC_ATTACH_FAILED, IBC_MALLOC_FAILED, IBC_ID_NOTAVAILABLE. The IBC_BADPARAM error flag indicates that an error condition occurred as a result of one of the parameters. The IBC_ATTACH_FAILED error flag indicates that virtual switch could not register the client due to internal resource limitations. The IBC_MALLOC_FAILED error flag indicates that enough system memory was not available to finish the requested operation. The IBC_ID_NOTAVAILABLE error flag indicates that the APID requested by the client is not available for use by the client.

The IBC_Init( ) call also may return an identifier granted by virtual switch, a list of GUIDs, and the number of GUIDs. The identifier returned by the call may be the identifier that is being granted to the client. The granted identifier may be different than the identifier requested (if any) by the client. The list of GUIDs includes the GUIDs pertaining to the hardware ports 110, 112 to which the client may have access in its node. The number of GUIDs includes a value that is, or is indicative of, the number of GUIDs that are in the list.

The IBC_Finish( ) call may be used to deregister a client from the virtual switch. This call may cause the virtual switch to release all resources (e.g., client identifiers and handles) that have been assigned for use by the client. This call may be performed before terminating the client application. The IBC_Finish( ) call may return a value of zero upon a successful termination. Otherwise, this call may return an IBC_NOT_INITIALIZED error message to indicate that the termination did not complete successfully.

The IBC_Send( ) call may be used to send packets of information. This call may create a packet having a header using the arguments provided in the call as well as one more default values. The header may include the source route and the source and destination APIDs. The call may return when the local packet transmission operation has completed.

The input parameters to the IBC_Send( ) call may include message_type, GUID, Destination_ID, Destination_CI, message, IBCLen, SourceRoute and OutPort. As its name suggests, the Message_Type indicates the type of message being sent. Examples of message types include read requests, write requests that are acknowledged by the recipient, write requests that are not acknowledged by the recipient, read responses, write responses, and negative acknowledgements. The GUID parameter points to the GUID of the NIC over which the packet is to be sent. The Destination_ID parameter may comprise the identifier of the destination node. The Destination_CI parameter may comprise the identifier of the client on the destination node. The message parameter includes the data payload in the packet. This argument may be ignored if the message type is a write response or read request. The IBCLen parameter comprises the length of the payload. The SourceRoute parameter points to the source route information included in the packet. The OutPort parameter includes the port on which to transmit the packet. Exemplary values of OutPort include PORT_0 and PORT_1.

The values returned by the IBC_Send( ) call may comprise 0 if the call is successful in sending a packet or an error code if the call is not successful. The error codes may include IBC_BADPARAM, IBC_HARDWARE_ERROR, and IBC_NOT_INITIALIZED. The IBC_BADPARAM is described above. The IBC_HARDWARE_ERROR indicates that an error has occurred with hardware (e.g., a NIC error). The IBC_NOT_INITIALIZED error indicates that the entity (e.g., client) issuing the IBC_SEND( ) command has not registered itself with the virtual switch by way of the IBC_Init( ) call discussed previously.

Each call to IBC_RecvPost( ) causes the virtual switch 140 to assign a "handle" to the caller application and to associate a receive buffer with the assigned handle. The handle may comprise an integer or other data construct. Using it, the virtual switch may locate the buffer for a subsequent incoming data packet targeting the caller application's APID. Packets remain in receive buffers until retrieved by the caller application. The virtual switch 140 thus maintains one or more handles for each registered application.

Figure 5:
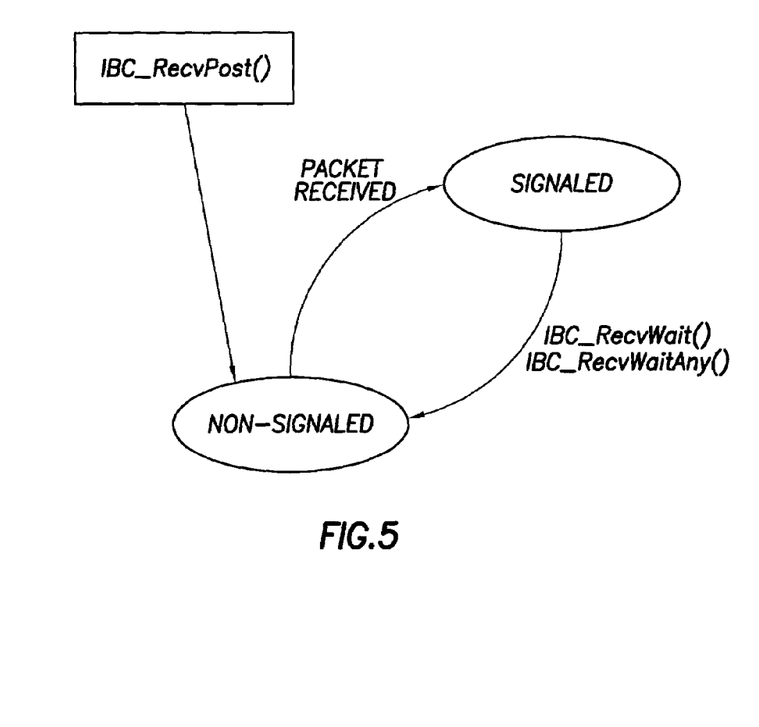
FIG. 5 shows a state diagram pertaining to the operation of a portion of the application programming interface.

FIG. 5 shows an exemplary state diagram illustrating the use of a handle to receive a packet. The handle has a state and the state may be the "non-signaled" state or the "signaled" state as shown in FIG. 5. The handle's non-signaled state means that the buffer associated with the handle is not yet filled with a packet destined for the caller application. The signaled state means that the virtual switch has received a packet for the caller application and that the application has yet to indicate its readiness to retrieve that packet. When a new handle is created, it is placed into the non-signaled state, indicating that the buffer (not specifically shown) associated with the handle is available for a new packet. The handle remains in the non-signaled state until a packet is received pertaining to the handle. At that time, the virtual switch transitions the handle to the signaled state to indicate that a packet has been received. The incoming packet is stored in the handle's buffer. The handle remains in the signaled state and the packet remains in the virtual switch's buffer generally until the application indicates that it is ready to receive the packet.

Referring still to FIG. 5, the application may indicate that it is ready to retrieve a received packet by calling either IBC_RecvWait( ) or IBC_RecvWaitAny( ). These calls are explained in more detail below.

The IBC_RecvPost( ) call returns a value of zero if it succeeds and a non-zero error code if it fails. The non-zero error code may be IBC_MALLOC_FAILED which indicates that there were insufficient resources to allocate data buffer for the handle. The non-zero error code may also be IBC_MAXHANDLE_USED which indicates that the maximum number of handles allowed have already been allocated and thus an additional handle could not be allocated at the time the call was made.

The IBC_CloseHandle ( ) accepts a handle as its input parameter. It may retire the handle and de-allocate the associated virtual switch buffer. The call returns with a result of zero upon successful completion and a non-zero error value upon failure. The non-zero error value may be IBC_BADPARAM which indicates that the handle input parameter is incorrect.

An application may call IBC_RecvWait( ) to indicate that it is able to receive a packet. The input parameters for this call include a handle previously assigned by the virtual switch to the application and a timeout value specifying the maximum duration for which the application may be blocked waiting for the matching packet to be stored into the handle's receive buffer. The caller may choose to specify a zero value for the timeout parameter to indicate that the call should not wait at all. The calling parameters include a plurality of pointers. One such pointer points to the application buffer into which the received packet should be copied by the virtual switch. Another pointer points to the structure that contains the GUID of the NIC on which the packet has arrived. Memory for this structure may be allocated by the application. Yet another pointer may identify the port on which the packet arrived into the virtual switch. An additional pointer may identify the APID of the application that sent the packet.

The values returned by the IBV_RecvWait( ) call may include IBC_RECVDONE, IBC_TIMEDOUT, or IBC_BADPARAM. The IBC_RECVDONE value may indicate that the packet has been successfully provided to the application's buffer. The IBC_TIMEDOUT return value may indicate that the timeout period has expired without a packet being provided to the application's buffer. The IBC_BADPARAM return value may indicate that the call failed because either the specified handle was invalid or one of the parameters caused an internal error.

In general, calling IBV_RecvWait( ) causes the calling application to block waiting for an incoming packet to be stored into the receive buffer of the handle supplied to the call as an input parameter. If a packet has already been received by the virtual switch at the time of the call, but the posted receive has not yet been completed (i.e., the handle is in the signaled state), then the call may return immediately. In this case, or in the case when the packet arrives before the timeout period expires, the handle may be left in the non-signaled state (i.e., the receive is completed and another receive is automatically posted) and the call returns with IBC_RECVDONE status. Otherwise, the IBC_RecvWait( ) call waits for a packet to be received or a timeout to occur before it returns. If the call times out, the handle is left in the non-signaled state and the IBC_TIMEDOUT status is returned. If the IBC_RecvWait( ) call was issued with a special NULL timeout value, then the call will never time out, effectively becoming a fully blocking call (i.e., the call will wait until the appropriate packet arrives). In this case, the return value is IBC_RECVDONE on success. If a timeout value of zero is passed into the call, it may return immediately with IBC_RECVDONE status. If a packet has already arrived, then the corresponding receive also completes. Upon receipt of a return value of IBC_RECVDONE, another receive may be posted.

An IBC_RecvWaitAny( ) call is similar to the IBC_RecWait( ) call described above, in that it may cause the virtual switch to provide an incoming packet to the corresponding application. Unlike IBC_RecvWait( ), however, this call generally waits for any of one or more previously posted receives to complete, rather than the one associated with a specific handle. The input parameters passed with this call may include pointers to a handle list, a list length and a timeout value. The handle list consists of one or more handles associated with previously posted receives. The list length parameters indicates the length of one or more lists in the call as described below. The behavior of the timeout value is similar to that described previously with regard to the IBC_RecvWait( ) call.

The output parameters associated with the IBC_RecvWaitAny( ) call may include the following lists: a GUID list, a 'received' list, a port list, a buffer list, and a source client list. The GUID list may include one or more GUIDs associated with NICs on which packets arrive. In at least some embodiments, if a packet has arrived for the i'th handle in the handle list, then for all such i, the i'th element in the GUID list may be filled with the GUID of the NIC on which the packet arrived. All other handles in the handle list may remain unaffected. The packet may be copied into the i'th buffer in the buffer list. The i'th element in the port list (used to indicate the ports on which each packet arrives) may be set to the number of the NIC port where the packet arrived. The i'th element in the 'received' list may be set to "true" to indicate that the corresponding handle's packet has arrived. The remaining elements of the 'received' list must be set to "false." The i'th element in the source client list may be set to the APID of the application at the source node. The values returned by the call may include some or all of the same values described above with regard to the IBC_RecvWait( ) call.

As noted above, the IBC_RecvWaitAny( ) call may wait for any of previously posted receives indicated by the handle list passed as part of the call. If a packet has been received for any of the handles passed into the call, but if the posted receive has not yet completed (i.e., the handle is in the signaled state), then the call may return promptly with a return status of IBC_RECVDONE. In this case, all such handles may be left in the non-signaled state (i.e., the corresponding receives have been completed and a new receive has been posted on each of the handles). Also, the corresponding application buffers in the buffer list may be filled with appropriate contents. Otherwise, this call may wait until a packet is received for any of the passed handles, or until a timeout occurs. If a packet arrives for any of the handles in the handle list before the timeout, the corresponding handle may be left in the non-signaled state (i.e., the corresponding receive is completed and another receive is posted on that handle) and the packet copied into the appropriate application buffer in the buffer list. In this case, the call may return IBC_RECVDONE.

If the IBC_RecvWaitAny( ) call times out, then all of the handles are left in the non-signaled state and the call returns a value of IBC_TIMEDOUT. If this call is made with a null timeout value, then it generally will not timeout and effectively becomes a fully blocking call and returns only when some handle's receive completes.

The IBC_RecvPoll( ) call polls, but does not wait, for the arrival of a packet for a previously posted receive. Unlike IBC_RecvWait( ) and IBC_RecvWaitAny( ), completion of IBC_RecvPoll( ) does not automatically transfer the received packet into the application's buffers. The only input parameter for this call is the handle of a previously posted receive. The value returned by the call may indicate the state of the handle. A return value of IBC_READYFORCOPY indicates that a packet has been received for that handle and is ready to be retrieved by the application. In this case, the packet may be retrieved using the IBC_RecvWait( ) or IBC_RecvWaitAny( ) calls described above. A return value of IBC_RECVNOTDONE indicates that the packet has not arrived for the handle passed in the call. The application may either poll again later or, if it has no other useful work to do, wait using IBC_RecvWait( ) or IBC_RecvWaitAny( ) calls. The IBC_RecvPoll( ) call may not change the state of the handle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electronic system, comprising:
   a processor;
   a network interface controller including a hardware port;
   a source-routed virtual switch implemented in software executed by said processor and including a plurality of software-implemented virtual ports, said virtual ports adapted to provide communication between an application running on said processor and said network interface controller; and
   an application programming interface ("API") running on said processor and usable by said application to interface with said virtual switch;
   wherein said electronic system is an end node in a network;
   wherein said source-routed virtual switch is adapted to receive a packet containing routing information, said routing information identifying an application in user application space that accesses said virtual switch; and
   wherein said API includes code to cause said virtual switch to open a handle and to post a receive buffer on said handle.

2. The electronic system of claim 1 wherein said API includes code that permits an application to register itself with the virtual switch to permit a resource to be assigned to said application.

3. The electronic system of claim 1 wherein said API includes code that permits an application to register itself with the virtual switch to permit a unique identifier to be assigned to said application.

4. The electronic system of claim 3 wherein said unique identifier assigned to the application is different than an identifier requested for the application.

5. The electronic system of claim 1 wherein said API further includes code to deregister said application from virtual switch to release a resource that has been assigned for use by said application.

6. The electronic system of claim 1 wherein said API includes code to permit said application to transmit data through said virtual switch to another application.

7. The electronic system of claim 1 wherein said code that causes the virtual switch to open a handle and post a receive buffer also includes code to transition said handle between a first state and a second state, said first state indicating that the switch has not received data to be provided to said application and said second state indicating that the virtual switch has received data to be provided to said application.

8. The electronic system of claim 1 wherein said API also includes code for closing said handle.

9. The electronic system of claim 1 wherein said API includes code to permit the application to inform the virtual switch that the application is ready to receive data.

10. The electronic system of claim 1 wherein said API includes code to permit the application to inform the virtual switch that the application is ready to receive data.

11. A network, comprising:
    a plurality of end nodes; and
    at least one switch coupling the nodes together;

wherein at least one of said end nodes includes:
a processor;
a network interface controller including a hardware port;
a virtual switch implemented in software executed by said processor and including a plurality of virtual ports, said virtual ports adapted to provide communication between an application running on said processor and said network interface controller; and
an application programming interface ("API") running on said processor and usable by said application to interface with said virtual switch;
wherein said virtual switch is adapted to receive a packet containing routing information, said routing information identifying an application in user application space that accesses said virtual switch; and
wherein said API includes code that permits an application to register itself with the virtual switch to permit a unique identifier to be assigned to said application.

12. The network of claim 11 wherein said API includes code that permits an application to register itself with the virtual switch to permit a resource to be assigned to said application.

13. The network of claim 11 wherein said API further includes code to deregister said application from virtual switch to release a resource that has been assigned for use by said application.

14. The network of claim 11 wherein said API includes code to permit said application to transmit data through said virtual switch to another application.

15. The network of claim 11 wherein said API includes code to cause said virtual switch to open a handle and to post a receive buffer on said handle.

16. The network of claim 15 wherein said code that causes the virtual switch to open a handle and post a receive also includes code to transition said handle between a first state and a second state, said first state indicates that the switch has not received data to be provided to said application and said second state indicates that the virtual switch has received data to be provided to said application.

17. The network of claim 15 wherein said API also includes code for closing said handle.

18. The network of claim 15 wherein said API includes code to permit the application to inform the virtual switch that the application is ready to receive data.

19. The network of claim 11 wherein said API includes code to permit the application to inform the virtual switch that the application is ready to receive data.

20. A computer readable storage medium storing instructions that when executed by a processor cause the processor to implement an application programming interface for a source routed, virtual switch implemented in an end node of a network, said virtual switch implemented in software on a computer, said instructions comprising:
an instruction usable to allocate a resource to an application to permit said application to access said software-implemented, source routed, virtual switch;
an instruction usable to permit said application to transmit data through said software-implemented, source routed, virtual switch;
an instruction usable to receive data provided to said application through said software-implemented, source routed virtual switch;
an instruction usable for the virtual switch to receive a packet containing routing information, said routing information identifying an application in user application space; and
an instruction usable to cause said virtual switch to open a handle and to post a receive buffer on said handle.

21. The storage medium of claim 20 further including an instruction usable to deallocate said resource upon said application ceasing using said virtual switch.

22. The storage medium of claim 20 further including an instruction usable to close said handle.

* * * * *